J. M. WADSWORTH
METHOD AND APPARATUS FOR CRACKING AND RECTIFYING PETROLEUM OILS AND THE LIKE
Oct. 14, 1930. Original Filed March 12, 1926 Re. 17,831
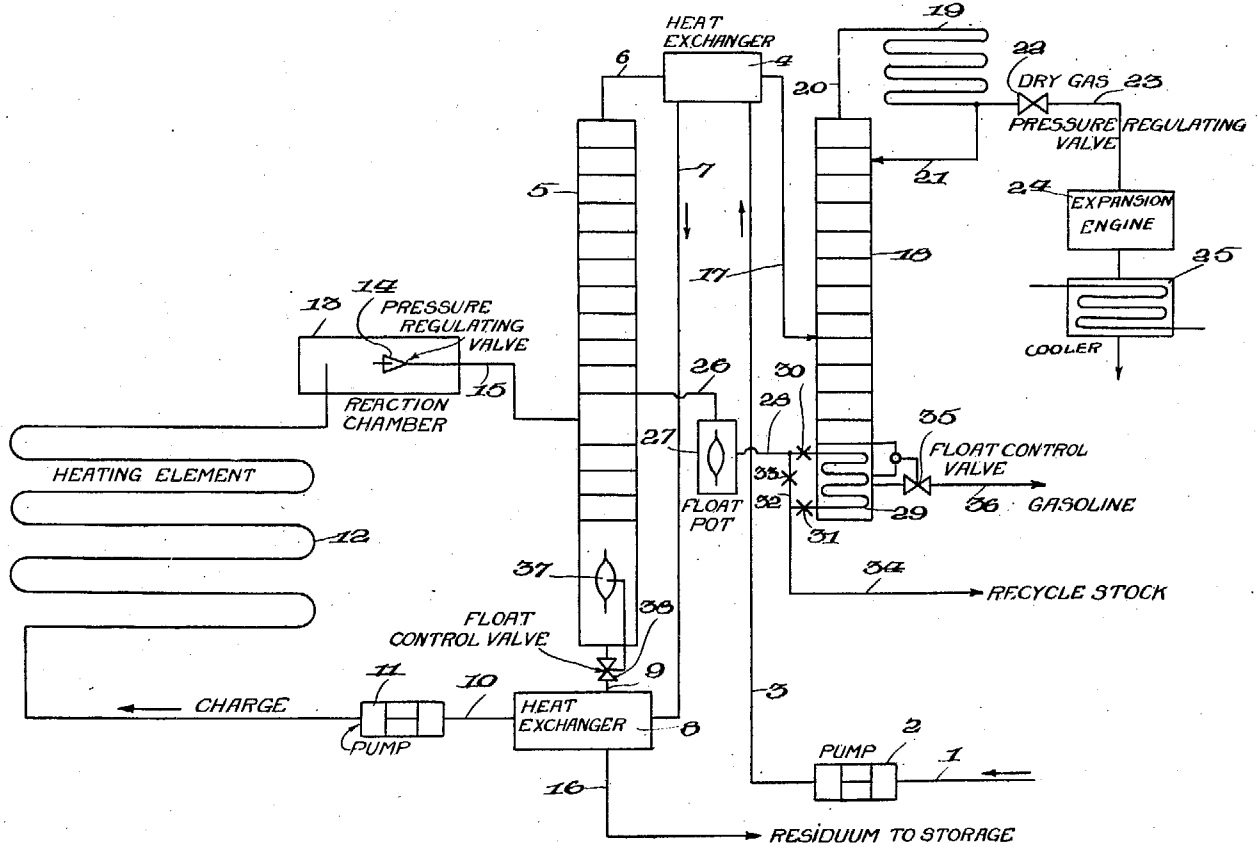
INVENTOR
J. M. WADSWORTH,
BY George A. Prowse
ATTORNEY.

Reissued Oct. 14, 1930 Re. 17,831

UNITED STATES PATENT OFFICE

JAMES M. WADSWORTH, OF TULSA, OKLAHOMA, ASSIGNOR TO UNIVERSAL OIL PRODUCTS COMPANY, OF CHICAGO, ILLINOIS, A CORPORATION OF SOUTH DAKOTA

METHOD AND APPARATUS FOR CRACKING AND RECTIFYING PETROLEUM OILS AND THE LIKE

Original No. 1,692,476, dated November 20, 1928, Serial No. 94,288, filed March 12, 1926. Application for reissue filed April 2, 1930. Serial No. 441,157.

This invention relates to a novel method and apparatus for cracking and rectifying petroleum oils and the like.

The majority of stills employed for cracking high boiling point hydrocarbons into low boiling point hydrocarbons now operate with the heating element and reaction chamber under considerable pressure. In many of the processes, it is the practice to relieve this pressure down to about three atmospheres and condense and rectify the products under this low pressure, which results in rendering rectification exceedingly difficult and necessitates an auxiliary gasoline plant of the absorption or compressor type to recover the gasoline carried away in the uncondensed gases relieved from the system. The gasoline made in the system under this low pressure is an unstable product due to its content of dissolved uncondensible gases. It is impossible to properly rectify the vapor from such a process under this low pressure without resorting to artificial cooling, at the top of the rectifying column. Processes in use which do not reduce the pressure before condensing make no effort to utilize this pressure to rectify the vapor and separate its gasoline content from the uncondensible gas.

Any hydrocarbon liquid at a given temperature exerts a certain vapor pressure. As this temperature is increased, the vapor pressure increases until it is sufficient to overcome the pressure above the liquid, when boiling will occur and the more volatile fractions be driven off.

The primary object of my invention is to utilize the existent pressure of the system to accomplish rectification of the lighter hydrocarbon components produced in cracking, such as the separation of pressure still gasoline from the so-called non-condensible gases. In this cracking operation, my method is based upon the fact that the problem involved is one of properly separating four components of a hydrocarbon mixture, for instance, 1, residual flux; 2, recycle stock; 3, cracked gasoline; and 4, uncondensed gases. So far as I am aware, none of the present tube and tank cracking stills or shell stills recognize the existence of the fourth component or provide rectifying means for separating the third and fourth components. For this reason the cracked gasoline produced by them contains a considerable amount of these uncondensed gases in dissolved form, and as a result, excessive losses are experienced in handling the commodity. In addition the uncondensed gases leaving the cracked gasoline condenser in most plants, contain a very considerable proportion of gasoline which can only be recovered through an efficient absorption or compression plant. My improved method utilizes the pressure already existent and available to accomplish the desired fractionation and results in a very marked saving over present means, and produces increased yields.

Referring again to the prior art, it may be stated that in the operation of any tube or tank pressure system now commercially used, the method pursued is to operate these plants under considerable pressure, and temperature for the purpose of destroying the molecular arrangements of the hydrocarbons to effect new groupings, so as to change a portion of the charged stock into hydrocarbons of lower boiling point. Having produced these lower boiling point hydrocarbons, it is desirable to rectify them into their respective components, and as before stated, in doing this I utilize the pressure and temperature already existent in the cracking plant to conduct the rectification of the lower boiling point hydrocarbons formed during cracking, and I carry out this rectification under said pressure or at a reduced pressure and temperature from that existing in the cracking unit. If the pressure and temperature employed during the cracking is not used for rectification, the products cannot be completely obtained without resorting to artificial cooling at the head of the rectifying column.

Each component of any hydrocarbon series has a certain vapor pressure for any given temperature and below a certain critical temperature and pressure exists in the liquid phase; above this critical temperature and pressure it will exist only in the vapor phase. It is desirable then to conduct the recitification at a temperature and pressure such that the desirable components will exist in the vapor phase.

From the foregoing, it will be understood that the main object of the present invention is to utilize the vapor pressure set up by the liquid resulting from the cracking operation to accomplish sharp rectification of the components of the liquid.

While I have set forth some of the objects of the present invention, other objects will appear as this description proceeds, and in reading the present description, reference should be had to the accompanying drawing.

The drawing is a diagrammatic view of an apparatus which I have devised for carrying out the improved process.

The oil to be subjected to cracking, enters the system by way of the pipe 1, and is forced by a pump 2, through a pipe 3, and a heat exchanger 4, the latter being heated by the vapors leaving a fractionation tower 5, through a pipe 6. The oil after passing through the heat exchanger, flows through a pipe 7 and then through a second heat exchanger 8, the latter being heated by the residuum discharged from the column 5, through a pipe 9. The oil thus preheated flows through pipe 10 into a high pressure pump 11 which forces the same under considerable pressure through a cracking coil 12, where it is heated to a cracking temperature. The heating coil discharges the oil into a reaction chamber 13 of the ordinary type. A suitable pressure regulating valve 14 is attached to the outlet pipe 15 of the reaction chamber, so that vapor and oil can be released from said chamber at any lower pressure desired. This mixture of vapor and oil enters the stripping column 5 about midway between the top and bottom of the same, and the residuum leaves at the bottom through the pipe 9 and enters the heat exchanger 8, where it functions to preheat the charging stock. From the heat exchanger, the residuum flows through a pipe 16 to storage. In the column 5, the gasoline and other vapors are separated from the residuum, and these vapors pass off through the heat exchanger 4 by way of pipe 6. This heat exchanger may, if desired, function as a reflux condenser, so that condensate resulting from the vapors may be returned to the top of the column 5 to cool the top of the column and provide the necessary reflux liquid for rectification. Vapors passing through the heat exchanger 4 are conducted by a pipe 17 to the central portion of a second rectifying column 18, which is equipped with a reflux condenser 19, to which the lightest vapors flow by way of pipe 20. All condensate is refluxed from this condenser through pipe 21 into the upper portion of the rectifying column, while the uncondensed gas passes out through a pressure regulating valve 22 into a pipe 23. The pressure may be released by permitting the same to operate an expansion engine 24, preferably the prime mover of the process itself, for the purpose of securing the work out of this expansion. Further, the cold created by the expansion of the dry gas may be employed to refrigerate a cooling medium in the cooler 25, and this refrigerating medium may be employed to condense the products yielded from the process.

In the first rectifying column 5, above the stripping portion of the same, a recycle stock may be drawn from one of the lower trays and may be fed through a pipe 26 into a float pot 27 which controls the passage of this recycle stock to a pipe 28 that conveys the same to a coil 29 arranged in the lower portion of the rectifying column 18. Hence, this recycle stock may be used as a heating medium for the second rectifying column. The coil 29 has regulating valves 30 and 31, and a by-pass pipe 32 is provided for the purpose of by-passing some of the recycle stock past the coil 29. The by-pass has a control valve 33, and the recycle stock is finally discharged through a pipe 34. The rectified gasoline at the lower portion of the column 18 is utilized to control a float valve 35, which regulates the flow of the finished gasoline through the discharge pipe 36.

A valve 38 in the pipe 9 at the lower portion of the column 5 is provided with a float 37, actuated by the residuum at the bottom of the tower 5.

In practicing my process, the incoming oil is cracked and the cracked vapors and oil are fed by the pipe 15 into the tower 5, the upper portion of which is a rectifier and the lower portion of which is a stripping still. In the column 5 the cracked vapors will rise while the oil will have a tendency to pass downward. Due to this counter current contact of vapors and oil the gasoline and other vapors will be sharpely separated from the residuum, and these vapors will finally enter the column 18. As this column has a heating means at its lower end, there will be a temperature gradient therein and this will result in sharp separation of the lighter gases from the gasoline vapors. Consequently all the components which it is desired to incorporate in the finished gasoline will gather at the bottom of the tower 18, and be discharged through the pipe 36, while the lighter components of the mixture which it is desired to eliminate from the gasoline will be discharged from the system by way of pipe 23. As the column 18 has a pressure control valve 22 at its gas outlet and a float control valve 35 at its liquid outlet, it is obvious that the column 18 will work under pressure, and consequently the vapor tension of the material undergoing treatment may be utilized to build up a predetermined pressure within the columns 5 and 18. Therefore, I am enabled by my process and apparatus to utilize the pressure and temperature existent for the cracking operation, to rectify the gasoline without resorting to further compression or extremely low temperatures.

The recycle stock after leaving the reboiler section in the second column may be returned to the suction of the pump charging the heating element, by any suitable means (not shown). This is the preferable way to operate in order to conserve whatever heat remains in the recycle stock.

While I have disclosed a preferred embodiment of the invention, it is obvious that the details of the method and apparatus may be varied without departing from the basic ideas which I have outlined above and which I will hereinafter claim.

What I claim and desire to secure by Letters Patent is:—

1. In a method of treating petroleum oils, cracking the oil under heat and pressure to produce a mixture of gasoline hydrocarbons, hydrocarbons lighter and heavier than gasoline hydrocarbons, and residuum, rectifying said mixture to sharply separate the gasoline hydrocarbons and lighter hydrocarbons from heavier hydrocarbons and residuum, subsequently rectifying said gasoline hydrocarbons and lighter hydrocarbons, and separately withdrawing from the second rectification step, rectified liquid gasoline and uncondensed gases, and utilizing during the rectification steps, the pressure resulting from the cracking step to effect the second rectification at super-atmospheric pressure and at temperatures from substantially atmospheric upwardly.

2. In a method of treating petroleum oils, cracking the oil under heat and pressure to produce a mixture of gasoline hydrocarbons, hydrocarbons lighter and heavier than gasoline hydrocarbons, and residuum, rectifying said mixture and thus sharply separating the gasoline hydrocarbons and lighter hydrocarbons from heavier hydrocarbons and residuum, subsequently rectifying said gasoline hydrocarbons and lighter hydrocarbons, and separately withdrawing from the second rectification step, rectified liquid gasoline and uncondensed gases, and utilizing the heat and pressure resulting from the cracking step during the rectification steps, to effect both rectifications at superatmospheric pressure and at temperatures from substantially atmospheric upwardly.

3. In a method of treating petroleum oils, cracking the oil under heat and pressure to produce a mixture of gasoline hydrocarbons, hydrocarbons lighter and heavier than gasoline hydrocarbons, and residuum, rectifying said mixture and thus sharply separating the gasoline hydrocarbons and lighter hydrocarbons from heavier hydrocarbons and residuum, subsequently rectifying said gasoline hydrocarbons and lighter hydrocarbons alone, and separately withdrawing from the second rectification step, rectified liquid gasoline and uncondensed gases, utilizing, during the rectification steps, the heat and pressure resulting from the cracking step to effect the rectification steps at super-atmospheric pressure and at temperatures from substantially atmospheric upwardly, and passing heavier hydrocarbons from the first rectification step through the second rectification step, and out of contact with the liquid therein to furnish the heat used in the second rectification step.

4. In a method of treating petroleum oils, cracking the oil under heat and pressure to produce a mixture of gasoline hydrocarbons, hydrocarbons lighter and heavier than gasoline hydrocarbons, and residuum, rectifying said mixture and sharply separating the gasoline hydrocarbons and lighter hydrocarbons from heavier hydrocarbons and residuum, subsequently rectifying said gasoline hydrocarbons and lighter hydrocarbons and separately withdrawing from the second rectification step, rectified liquid gasoline and uncondensed gases, utilizing during the rectification steps, pressure from the cracking step, to effect the rectification steps at super-atmospheric pressure and at temperatures from substantially atmospheric upwardly, and utilizing between the first and second rectification steps, the heat from the residuum and said gasoline hydrocarbons and lighter hydrocarbons to preheat charging stock.

5. The process of treating hydrocarbon oil consisting in subjecting the oil to a cracking temperature and pressure, releasing the hydrocarbons from the cracking sphere while lowering the pressure on the released hydrocarbons slightly but not below superatmospheric, rectifying said hydrocarbons to sharply separate gasoline hydrocarbons and lighter hydrocarbons from heavier hydrocarbons and residuum, withdrawing the gasoline hydrocarbons and lighter hydrocarbons from the rectification step in the heated condition resulting from the cracking step, separately withdrawing the residuum from the rectification step, also in the heated condition resulting from the cracking step, utilizing said gasoline hydrocarbons, lighter hydrocarbons and residuum to preheat charging stock, subsequently rectifying said gasoline hydrocarbons and lighter hydrocarbons under superatmospheric pressure derived from the cracking step, to split the same into stable gasoline and uncondensed gases, separately withdrawing from the second rectification step, rectified liquid gasoline and uncondensed gases, and utilizing heavier hydrocarbons in heated condition from the first rectification step to furnish the heat employed in the second rectification step.

6. An apparatus for treating hydrocarbon oils, comprising an inlet pipe provided with a plurality of heat exchangers and a plurality of pumps, one of said pumps being adapted to raise the pressure of the oil above that of the other pump, a cracking unit connected to said inlet pipe, a first rectifying column, means for feeding hydrocarbons from the cracking unit into an intermediate portion of said column, means for feeding residuum liquid from the lower portion of said column through one of said heat exchangers, a second rectifying column, means for feeding light hydrocarbons from the top of the first rectifying column, through the other one of said heat exchangers and into an intermediate portion of the second column, a heating element arranged in the lower portion of the second column, means for feeding a part of the material undergoing treatment from the first column through said heating element, a reflux condenser, at the upper portion of the second column, a gasoline outlet at the lower portion of the second column, a dry gas outlet from said reflux condenser, and a pressure regulating valve in the last mentioned column to permit the vapor pressure of the material undergoing treatment to exert sufficient pressure in the columns to carry out rectification without the use of relatively low temperature cooling mediums.

7. In a method of treating petroleum oils, cracking the oil under heat and pressure to produce a mixture containing gasoline hydrocarbons, hydrocarbons lighter and hydrocarbons heavier than gasoline hydrocarbons, rectifying the mixture to sharply separate the gasoline hydrocarbons and lighter hydrocarbons from the hydrocarbons heavier than gasoline, subsequently rectifying said gasoline hydrocarbons and lighter hydrocarbons, and separately withdrawing from the second rectification step, rectified liquid gasoline and uncondensed gases, and utilizing during the rectification steps, the pressure resulting from the cracking step to effect the second rectification at superatmospheric pressure and at temperatures from substantially atmospheric upwardly.

8. In a method of treating petroleum oils, cracking the oil under heat and pressure to produce a mixture containing gasoline hydrocarbons, hydrocarbons lighter and hydrocarbons heavier than gasoline hydrocarbons, rectifying the mixture and thus sharply separating the gasoline hydrocarbons and lighter hydrocarbons from heavier hydrocarbons, subsequently rectifying said gasoline hydrocarbons and lighter hydrocarbons, and separately withdrawing from the second rectification step, rectified liquid gasoline and uncondensed gases, and utilizing the heat and pressure resulting from the cracking step during the rectification steps, to effect both rectifications at superatmospheric pressure and at temperatures from substantially atmospheric upwardly.

9. In a method for treating petroleum oils, cracking the oil under heat and pressure to produce a mixture containing gasoline hydrocarbons, hydrocarbons lighter and hydrocarbons heavier than gasoline hydrocarbons, rectifying the mixture and thus sharply separating the gasoline hydrocarbons and lighter hydrocarbons from heavier hydrocarbons, subsequently rectifying said gasoline hydrocarbons and lighter hydrocarbons alone, and separately withdrawing from the second rectification step, rectified liquid gasoline and uncondensed gases, utilizing during the rectification steps, the heat and pressure resulting from the cracking step to effect the rectification steps at superatmospheric pressure and at temperatures from substantially atmospheric upwardly, and passing heavier hydrocarbons from the first rectification step through the second rectification step, and out of contact with the liquid therein to furnish the heat used in the second rectification step.

10. In a method of treating petroleum oils, cracking the oil under heat and pressure to produce a mixture containing gasoline hydrocarbons, hydrocarbons heavier and hydrocarbons lighter than gasoline hydrocarbons, rectifying the constituents of the mixture and sharply separating the gasoline hydrocarbons and lighter hydrocarbons from heavier hydrocarbons in the mixture, subsequently rectifying said gasoline hydrocarbons and lighter hydrocarbons and separately withdrawing from the second rectification step rectified liquid gasoline and uncondensed gases, utilizing, during the rectification steps, pressure from the cracking step, to effect the rectification steps at superatmospheric pressure and at temperatures from substantially atmospheric upwardly, and utilizing between the first and second rectification steps, the heat from said gasoline hydrocarbons and lighter hydrocarbons to preheat charging stock.

JAMES M. WADSWORTH.